Patented May 20, 1952

2,597,019

UNITED STATES PATENT OFFICE 2,597,019

NUTRIENT ADJUNCT FOR THE PREPARATION OF STREPTOMYCIN

Wendell W. Moyer, Camas, Wash., and William F. Allen, Decatur, Ill., assignors to A. E. Staley Manufacturing Company, Decatur, Ill., a corporation of Delaware No Drawing. Application July 1, 1947, Serial No. 758,480

2 Claims. (Cl. 195—100)

This invention relates to the provision of nutrient compositions used in the culturing of microorganisms and to the preparation of fermentation products derived thereby. More specifically, it pertains to the culturing of microorganisms for the production of antibiotic substances, such as streptomycin, having particular reference to culturing methods wherein the nutrient adjunct contains a combination of protein and added natural amino acids.

A principal object of the invention is to provide a nutrient adjunct which, when used in the culturing of microorganisms, will stimulate the microorganisms to generate increased yields of substances which are desired to be obtained.

Another object of the invention is the provision of a nutrient adjunct which, when used in the culturing of microorganisms, stimulates the microorganisms to form desirable fermentation products at an increased rate, whereby increased yields of such products per unit time are obtained.

An additional object of the invention is the provision of an improved nutrient adjunct which, when used in the culturing of microorganisms, so influences the course of fermentation as to avoid the production of undesirable substances which are deleterious and troublesome in the subsequent isolation and purification processes.

A further object of the invention is the provision of a nutrient adjunct which, when used in the culturing of streptomycin-producing microorganisms, stimulates the microorganisms to generate increased yields of streptomycin.

A still further object of the invention is the provision of an improved nutrient adjunct which, when used in the culturing of streptomycin-producing microorganisms, influences the course of fermentation in such a manner as to avoid the production of undesirable histamine-like bodies which are deleterious and troublesome in the subsequent isolation and purification processes.

Another object of the invention is the preparation of fermentation products by culturing microorganisms in media containing nutrient adjuncts prepared in accordance with the invention embodied by the disclosure hereinafter set forth and claimed.

Other objects of the invention will in part be obvious and will in part appear hereinafter.

The invention accordingly comprises the several steps and the relation of one or more such steps with respect to each of the others, and the product possessing the features, properties and relation of constituents, which are exemplified in the following disclosure, and whose scope of application is indicated in the appended claims.

In a biological process, as in any chemical process, increased efficiency in the transformation of raw material into the desired end product is of prime importance. Where the yield in such process is small and the cost of recovery of the desired product from a large proportion of waste material is high, the yield becomes a controlling factor in the cost of production.

In the production of antibiotic substances by microorganisms in present fermentation processes, the yield of these substances is only a small fraction of one percent of the weight of nutrient materials used in the culture media. Consequently, the desired substance in the spent culture medium must be concentrated and isolated from relatively large volumes of liquor. This is commonly done by means of selective adsorption or solvent extraction processes. In addition to this, the fermentation processes are relatively slow, requiring several days to provide a maximum yield of product. As a result of these limiting factors, large and numerous units of equipment are required to provide even small quantities of purified product from a single fermentation. This is the situation, for example, in the case of streptomycin production.

In the process for producing streptomycin, a suitable microorganism such as *Streptomyces griseus* may be cultured in an aqueous medium containing representative materials selected from three broad classes of the following essential ingredients:

(a) An organic nitrogen source, such as peptone, beef extract, yeast extract, corn steepwater, vegetable protein material such as soybean meal, casein, enzyme-converted proteins, grain fermentation residues, and the like.

(b) A carbohydrate, such as glucose, corn syrup, starch, modified starches, dextrins, soybean carbohydrate, lactose, maltose.

(c) A mineral supplement, such as sodium chloride, magnesium sulfate, ferrous sulfate, potassium phosphate, ammonium sulfate, potassium sulfate, calcium carbonate, etc., or combinations of these.

The concentrations of substances from these classes in the medium may be varied widely depending upon the combination chosen, but ordinarily varies between 0.5 percent and 2 percent, governed by the fermentation process being employed.

The culturing of microorganisms for the production of streptomycin either may be carried out by the surface-growth method or by the submerged-growth method. Both of these means have been employed in experimental work but in a commercial process the organism is usually grown by the submerged method in large aerated tanks.

The yield of streptomycin is affected by many factors. Foremost of these is the nutrient medium composition itself, which can vary in the nature, concentration and proportions of the individual components employed. The balance between the nitrogen, carbohydrate and mineral ingredients is very sensitive and a combination of protein and sugars which give good results with one mineral supplement might be almost worthless with a different mineral supplement or a different proportion of the same one. This situation is complicated by the presence in most naturally occurring proteins and carbohydrates of various mineral ingredients. Another factor influencing yield is the process of fermentation to be practiced, that is to say, the selection of the proper physical conditions. A medium that gives optimum results under one set of operating conditions may be inferior in another. Aeration, agitation, temperature, time and type of equipment are important variables.

Soybean meal, with suitable carbohydrate and mineral supplements, has proven to be one of the most desirable organic nitrogen sources because it gives relatively high yields of streptomycin. These increased yields, based on the weight of nutrient materials used, are still so low, however, that the producton cost of streptomycin is undesirably high.

The present invention is based on the unexpected discovery that a mixture of soybean meal and amino acids having a weight ratio of protein to amino acids falling within certain critical limits, when used to supply the organic nitrogen in the medium for culturing *Streptomyces griseus*, increases the yield of streptomycin to a pronounced and unusual degree. The increase in yield varies from about 20 percent to 100 percent or more over that obtained with conventional organic nitrogen supplements. Furthermore, the use of amino acids in conjunction with soybean meal or protein does not promote the formation of histamine-like bodies with the streptomycin.

In accordance with the principles of the present invention, increased yields of streptomycin are obtained by using combinations of protein and amino acids in which the weight ratio of the former to the latter varies from about 2 to 50. Maximum yields are obtained when the ratio of protein to amino acids falls within the range of about 5 to 10. These ratios are based on the actual protein content of a crude protein raw material, such as soybean meal, and not on the total weight of such material. For example, a combination of 96 parts of soybean meal containing 41 percent protein (i. e., 6.5 percent nitrogen) and 4 parts of amino acids provides a protein to amino acid ratio of 9.7. It will be observed that the amount of protein always exceeds the amount of amino acids present.

The present invention is not limited to the use of any particular kind or class of protein. However, soybean meal or soybean protein is preferred because of its availability, low cost, and the fact that it yields no histamine-like bodies when used as a nutrient adjunct in the culturing of *Streptomyces griseus* in the production of streptomycin.

Any of the natural amino acids, or combinations thereof, are suitable for the practice of this invention. The amino acids referred to are those which may be found, for example, in protein hydrolyzates. A preferred amino acid material is a mixture of mono-amino mono-carboxylic amino acids which may be conveniently crystallized from neutralized and concentrated hydrolyzates of corn, wheat, or soybean protein. Such a mixture of amino acids consists chiefly of leucine, isoleucine, methionine, valine, alanine, tyrosine and phenylalanine.

The invention is more specifically illustrated by the following examples which have to do with the preparation of streptomycin by the culturing of suitable microorganisms. Satisfactory methods for the growing of streptomycin-producing micro-organisms in appropriate media, and for the recovery, purification and assay of the generated streptomycin, are well known and need not be described here. The examples relate to the submerged culture method, using an active strain of *Streptomyces griseus*, but other methods of culturing streptomycin-producing micro-organisms may be used.

*Example 1*

A mixture of 144 grams of ground soybean expeller meal (45 percent protein), 6 grams of the mixed mono-amino mono-carboxylic acids crystallized from a neutralized and concentrated hydrolyzate of wheat gluten, 100 grams of dextrose, 50 grams of sodium chloride, and 10 kg. of water was sterilized in an autoclave and then cooled to about 40° C. This sterile medium containing 10.8 parts of protein to one part of amino acids was inoculated with spores of *Streptomyces griseus* and incubated at 80° F. for a period of about 48 to 96 hours.

A control medium identical to the above, except that the amino acid fraction was omitted, was inoculated and incubated in the same manner. The medium containing the mixture of soybean meal and amino acids produced 115 percent more streptomycin per unit volume than did the control medium.

*Example 2*

Same as Example 1 except that the ratio of protein to amino acids in the medium was reduced to a value of about 7 by using 140 grams of soybean expeller meal and 9.0 grams of the mixed amino acids. The increase in yield of streptomycin over that of the control medium in this case was 65 percent.

*Example 3*

Same as Example 1 except that 146 grams of ground soybean expeller meal and 4 grams of mixed amino acids were used, providing a protein to amino acid ratio of about 16.4. Here the increase in yield of streptomycin over the control medium was about 70 per cent.

*Example 4*

Same as Example 1 except that the ratio of protein to amino acids was reduced to a value of about 5.2 by using 138 grams of the expeller meal and 12 grams of the mixed amino acids. This increased the yield of streptomycin over the control medium by about 25 per cent.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desired to secure by Letters Patent is:

1. A nutrient composition for the growth of streptomycin-producing microorganisms, which consists essentially of soybean meal and, as a growth-promoting and streptomycin-production stimulating factor, a mixture of mono-amino, mono-carboxylic amino acids obtained from a neutralized and concentrated protein hydrolyzate selected from the group consisting of corn, wheat and soybean protein hydrolyzates, said soybean meal being present in the ratio of 2 to 50 parts by weight, based on the protein content thereof, to 1 part by weight of said amino acids.

2. In the preparation of streptomycin by culturing streptomycin-producing microorganisms in an aqueous medium containing soybean meal as the primary source of organic nitrogen, the improvement comprising: adding to the medium, as a growth-promoting and streptomycin-production-stimulating factor, a mixture of mono-amino, mono-carboxylic amino acids obtained from a neutralized and concentrated protein hydrolyzate selected from the group consisting of corn, wheat and soybean protein hydrolyzates, said soybean meal being present in the ratio of 2 to 50 parts by weight, based on the protein content thereof, to 1 part by weight of said amino acids.

WENDELL W. MOYER.
WILLIAM F. ALLEN.

REFERENCES CITED

The following references are of record in the file of this patent:

UNITED STATES PATENTS

| Number | Name | Date |
| --- | --- | --- |
| 1,015,891 | Ikeda et al. | Jan. 30, 1912 |
| 2,051,017 | Schwarz | Aug. 11, 1936 |
| 2,285,708 | Glynn | June 9, 1942 |
| 2,364,008 | Stuart | Nov. 28, 1944 |
| 2,422,230 | Foster | June 17, 1947 |
| 2,437,918 | McCormack | Mar. 16, 1948 |
| 2,461,922 | Rake et al. | Feb. 15, 1949 |

OTHER REFERENCES

McMahon, Jour. Bact., April 1944, pp. 400–401.

Le Page et al., Jr. Biological Chem., volume 162, No. 1, January 1946, pages 163 to 171.

Staff Meetings of the Mayo Clinic, vol. 19, No. 23, Rochester, Minn., Nov. 15, 1944, pages 537 to 548.

Schatz et al., "Streptomycin" Proc. Soc. Exptl. Biol. & Med., January 1944, pp. 66 to 69.